(12) United States Patent
Hieber et al.

(10) Patent No.: US 12,334,663 B2
(45) Date of Patent: Jun. 17, 2025

(54) ELECTRICAL CONTACT ELEMENT

(71) Applicant: Phoenix Contact GmH & Co. KG, Blomberg (DE)

(72) Inventors: Alexander Hieber, Herrenberg (DE); Holger Ritter, Wurmberg (DE); Ulrich Rosemeyer, Schieder-Schwalenberg (DE); Fehim Domazet, Calw-Heumaden (DE); Juergen Sahm, Ammerbuch (DE); Benjamin Herwanger, Bondorf (DE); Henning Steeg, Bondorf (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 286 days.

(21) Appl. No.: 17/799,940

(22) PCT Filed: Dec. 17, 2020

(86) PCT No.: PCT/DE2020/101074
§ 371 (c)(1),
(2) Date: Aug. 16, 2022

(87) PCT Pub. No.: WO2021/164800
PCT Pub. Date: Aug. 26, 2021

(65) Prior Publication Data
US 2023/0062066 A1   Mar. 2, 2023

(30) Foreign Application Priority Data
Feb. 19, 2020   (BE) .................................. 2020/5108

(51) Int. Cl.
*H01R 13/11* (2006.01)
*H01R 4/02* (2006.01)
(Continued)

(52) U.S. Cl.
CPC .............. *H01R 13/111* (2013.01); *H01R 4/02* (2013.01); *H01R 43/02* (2013.01); *H01R 43/16* (2013.01)

(58) Field of Classification Search
CPC .......... H01R 4/02; H01R 4/023; H01R 12/57; H01R 43/0256; H01R 43/02; H01R 43/16; H01R 13/111
(Continued)

(56) References Cited

U.S. PATENT DOCUMENTS 2,689,337 A * 9/1954 Burtt ................... H01R 13/432
439/874
4,735,575 A * 4/1988 Shaffer ................ H01R 12/585
439/82
(Continued)

FOREIGN PATENT DOCUMENTS

CA        2170436 A1 *  8/1996
JP     2010283107 A    12/2010
(Continued)

*Primary Examiner* — Marcus E Harcum
(74) *Attorney, Agent, or Firm* — LEYDIG, VOIT & MAYER, LTD.

(57) ABSTRACT

An integral stamped-rolled electrical contact element, comprising: a terminal portion and an adjoining soldered portion for electrically contacting a contact face by a soldered connection. The soldered portion has a sleeve slit in a longitudinal direction. An interior space of the soldered portion is at least one of continuously hollow, interrupted, or at least partially filled in the longitudinal direction.

8 Claims, 3 Drawing Sheets

(51) Int. Cl.
*H01R 43/02* (2006.01)
*H01R 43/16* (2006.01)

(58) Field of Classification Search
USPC .................................................. 439/83, 576
See application file for complete search history.

(56) References Cited

U.S. PATENT DOCUMENTS

| | | | | |
|---|---|---|---|---|
| 5,209,681 | A * | 5/1993 | Brown | H01R 12/58 |
| | | | | 439/876 |
| 5,295,862 | A * | 3/1994 | Mosquera | H01R 12/7064 |
| | | | | 439/82 |
| 6,179,631 | B1 * | 1/2001 | Downes | H05K 3/3447 |
| | | | | 228/56.3 |
| 6,254,422 | B1 * | 7/2001 | Feye-Hohmann | H01R 4/4833 |
| | | | | 439/441 |
| 6,623,283 | B1 * | 9/2003 | Torigian | H05K 3/3426 |
| | | | | 439/876 |
| 6,997,727 | B1 * | 2/2006 | Legrady | H01R 12/718 |
| | | | | 439/246 |
| 7,090,547 | B2 | 8/2006 | Machida et al. | |
| 7,128,623 | B2 * | 10/2006 | Kitajima | H01R 13/055 |
| | | | | 439/876 |
| 8,454,397 | B2 * | 6/2013 | Nishi | H01R 4/028 |
| | | | | 439/876 |
| 9,406,633 | B2 * | 8/2016 | Isozaki | H01L 23/49811 |
| 9,520,666 | B2 * | 12/2016 | Hagemeier | H01R 13/5202 |
| 9,806,442 | B2 * | 10/2017 | Geske | H01R 12/716 |
| 10,170,394 | B2 | 1/2019 | Komatsu | |
| 10,854,998 | B2 * | 12/2020 | Ito | H01R 4/20 |
| 2001/0010626 | A1 * | 8/2001 | Komatsu | H01R 12/718 |
| | | | | 361/752 |
| 2010/0147553 | A1 * | 6/2010 | Baumgart | H05K 3/3452 |
| | | | | 29/527.1 |
| 2011/0256772 | A1 * | 10/2011 | Feldner | H01R 12/727 |
| | | | | 439/626 |
| 2013/0237070 | A1 * | 9/2013 | Wehrle | H01R 13/64 |
| | | | | 439/83 |
| 2013/0303004 | A1 * | 11/2013 | Daughtry, Jr. | H01R 12/7076 |
| | | | | 439/83 |
| 2014/0024232 | A1 * | 1/2014 | Wehrle | H01R 12/712 |
| | | | | 439/83 |
| 2016/0149325 | A1 * | 5/2016 | Imaizumi | H01R 12/716 |
| | | | | 439/83 |
| 2016/0343642 | A1 | 11/2016 | Komatsu | |
| 2016/0343647 | A1 | 11/2016 | Kai et al. | |
| 2018/0048082 | A1 * | 2/2018 | Sabo | H01R 43/01 |

FOREIGN PATENT DOCUMENTS

| | | | | |
|---|---|---|---|---|
| JP | 2016219554 | A | 12/2016 | |
| KR | 20050026917 | A | 3/2005 | |
| WO | WO-9423475 | A1 * | 10/1994 | H01L 24/72 |
| WO | WO 2016024445 | A1 | 2/2016 | |

\* cited by examiner

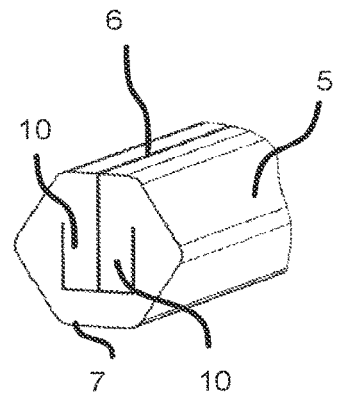
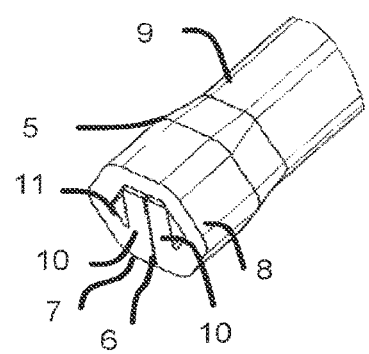
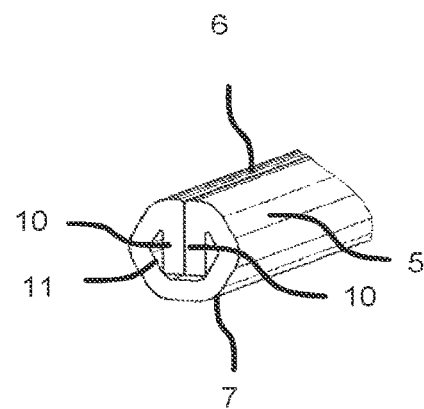
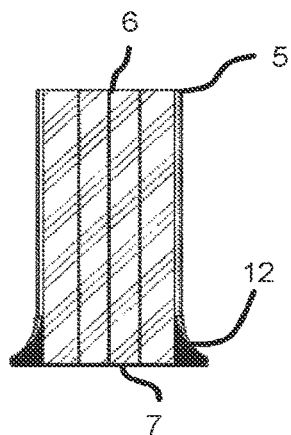
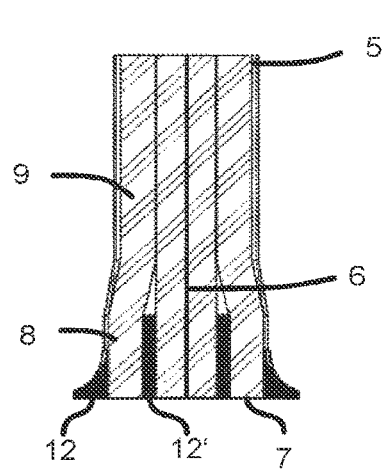
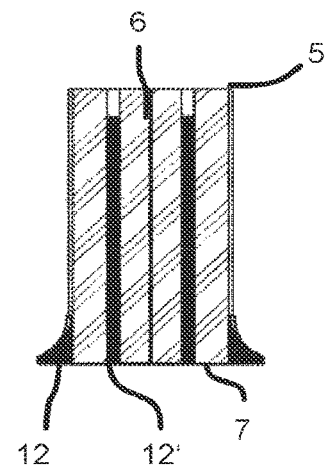
Fig. 3A　　　　　　　　Fig. 3B　　　　　　　　Fig. 3C
Fig. 3

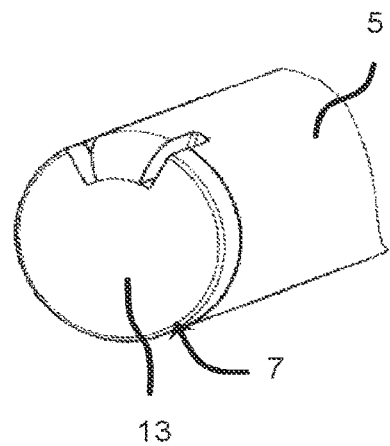
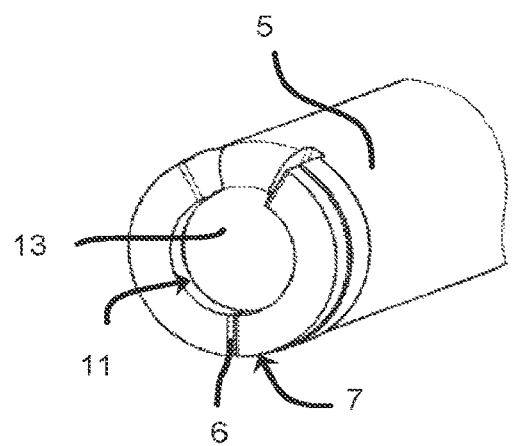
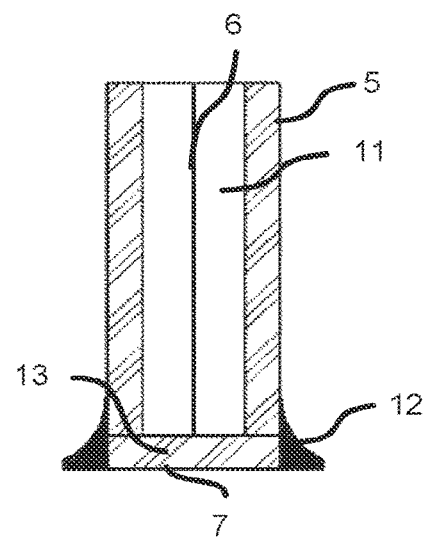
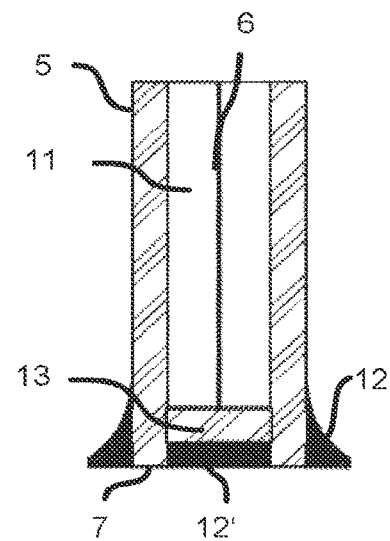
Fig. 4A        Fig. 4B
Fig. 4

ELECTRICAL CONTACT ELEMENT

CROSS-REFERENCE TO PRIOR APPLICATIONS

This application is a U.S. National Phase application under 35 U.S.C. § 371 of International Application No. PCT/DE2020/101074, filed on Dec. 17, 2020, and claims benefit to Belgian Patent Application No. BE 2020/5108, filed on Feb. 19, 2020. The International Application was published in German on Aug. 26, 2021 as WO/2021/164800 under PCT Article 21(2).

FIELD

The present invention relates to an integral, stamped-rolled electrical contact element comprising a terminal portion and an adjoining soldered portion for electrically contacting a contact face.

BACKGROUND

Such contact elements are used for electrically contacting a contact face on a printed circuit board, preferably by means of a soldered connection, and are typically inserted in the longitudinal direction into a contact carrier. Depending on the embodiment, the rear terminal portion serves to either directly connect an electrical conductor to the contact element or to establish the contact by means of a contact pin which can be inserted into the contact element in the longitudinal direction and is connected to an electrical conductor.

In principle, given products that are used for the surface mounting of printed circuit boards for SMD population are preferably produced as a turned part or as a stamped-rolled part. For reasons of space in the pin arrangement of the plug-in region, only a wall thickness or sheet metal thickness of 0.2 to 0.25 mm is possible so that the fixing normally takes place via an interference fit between contact and a contact carrier/insulating body. This allows necessary accuracies to be realized for all surfaces to be soldered, in particular given SMD products. Beyond the positional accuracy of the surfaces to be soldered, there are rules regarding the design of the geometries with respect to the face to be soldered. Particularly when a sufficient mechanical stability must be ensured due to the geometric boundary conditions for high-density, cylindrically arranged contact systems having a small space requirement, the known terminals are less suitable.

Thus, for example, the L-shaped wall terminal is only suitable to a limited extent since a de-concentration of the contacts in the direction of the printed circuit board has a high space requirement. In addition, this terminal is slightly elastic due to the typically used thin plates in the soldering region (generally the region in which a soldering takes place) so that the surface cannot be used simultaneously for mounting the contact in the contact body. For this purpose, a plane to which the mounting force may be applied must additionally be provided at the contact. This leads to inaccuracies in the manufacturing process since the tolerances from force application plane to solder face must additionally be taken into account.

Furthermore, so-called J-terminals are known in which the sheet metal is bent in the soldering region in order to in this way achieve more solder area given thin sheet metal thicknesses. In comparison to the above-described L-terminals, these terminals have a smaller space requirement and increased rigidity, provided that the work is performed with doubled sheet metal thickness in order to stabilize the soldering region. However, the production of such a terminal is more expensive since the sheet metal strip for the production of the contact must have greater dimensions corresponding to the material bent by 180°.

Given another type of terminals with solder joints, correspond to turned contacts. Here, a solid rear region is provided for soldering, which enables both sufficient solder area and stability for the assembly process. The front region is sleeve-like for the insertion of a contact pin. Via this coaxial construction, this terminal has the smallest space requirement. A realization via a stamped-rolled contact must be placed on a stepped plate due to the necessarily thin sheet metal strip given a pin arrangement of 0.2 to 0.25 mm. So that sufficient stability for the assembly process and sufficient area for soldering are available, a thicker plate is used in the basic state but must then be reduced in a complicated manner to the required thin sheet metal thickness for the front region. This makes production more expensive and increases the weight of the contact.

SUMMARY

In an embodiment, the present invention provides an integral stamped-rolled electrical contact element, comprising: a terminal portion and an adjoining soldered portion configured to electrically contact a contact face by a soldered connection, wherein the soldered portion comprises a sleeve slit in a longitudinal direction, and wherein an interior space of the soldered portion is at least one of continuously hollow, interrupted, or at least partially filled in the longitudinal direction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 shows various soldered portions of contact elements according to FIG. 2 in a perspective view and a sectional view given SMD, with a contact element completely closed in its cross-sectional contour (FIG. 3A), with a contact element closed from a defined height in its cross-sectional contour (FIG. 3B), and with a contact element completely open in its cross-sectional contour (FIG. 3C); and FIG. 4 shows soldered portions of contact elements with a soldered portion in which the cross-sectional contour is circular in a perspective view and a sectional view given SMD, with a solder barrier at the free end (FIG. 4A) and a solder barrier arranged remotely from the free end (FIG. 4B).

DETAILED DESCRIPTION

Figure 1:
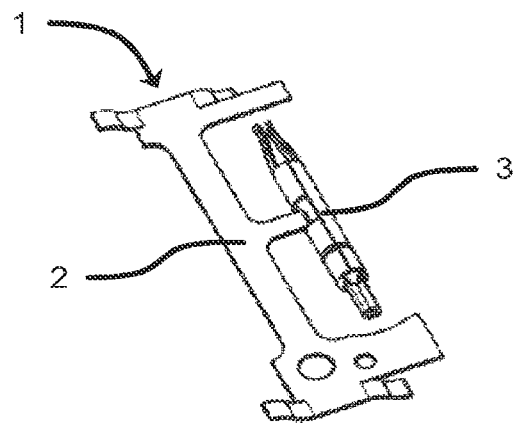
FIG. 1 shows a contact with a stamped-rolled contact on a sheet metal strip.

In an embodiment, the present invention provides an integral, stamped-rolled contact part which, given a small space requirement on the printed circuit board, enables good stability during assembly, is optimally solderable, and is inexpensive to realize.

According to the invention, the contact element has a soldered portion which has the shape of a slit sleeve and is designed as such. This rolled sleeve has a slit which results from the production and is as narrow as possible for reasons of stability, in extreme cases approximates zero because the sleeve edges abut against one another. Depending on the embodiment, the interior space of the soldered portion is continuously hollow, interrupted, or at least partially filled in the longitudinal direction. The embodiment is oriented toward the required stability of the soldered portion and the available solder quantity on the solder pad of the printed circuit board, to which the soldered portion is soldered. Due to capillary forces, the solder rises in the interior space and thus serves to increase stability in addition to a solder fillet that forms on the printed circuit board on the outer circumference of the soldered portion. If insufficient solder quantity is present on the solder pad or if the additional stability is not necessary, a solder resist is required. The soldered portion may thus be continuous over the entire length, have an interior space to be filled with solder only over a certain distance, or have no interior space at all. A contact element designed in such a way thus has a significantly lower weight than a turned contact element, wherein the stability may be or is increased not only by further measures in the soldering region but also by the in-flowing solder. The invention is suitable for both SMD and THR/THT. In this respect, given SMD, the contact ends above a printed circuit board and given THR/THT, the contact does not end above a printed circuit board but rather dips through bore holes into the printed circuit board or through the printed circuit board.

The soldered portion expediently has, at least partially in the interior space, a surface taking up solder and beginning at the free end on the inner surface. Said surface is produced galvanically and brings about good wetting capability of the inner surface by inflowing solder. Depending on the purpose, the electroplating may also take place after the rolling.

According to one embodiment of the invention, a solder barrier is arranged in the interior space against solder rising from the free end into the interior space. Depending on the embodiment of the soldered portion, this may be designed differently. In one embodiment of the invention, in which the soldered portion is in principle continuously tubular in design, i.e., the sleeve edges are arranged completely or also somewhat at a distance from one another but still impart a tubular impression, the solder barrier is a curved flap which is punched out of the circumferential surface of the contact portion, is located in the interior space, and seals the latter against further rising solder. This flap preferably has an omega-like shape so that the circular diameter of the interior space is also sealed as tightly as possible and the rising solder cannot pass the solder barrier. This solder barrier is punched out of the blank and bent after the rolling. It may be arranged at any point in the length of the soldered portion.

According to another preferred embodiment of the invention, the sleeve edges formed along the slit are bent inward and protrude into the interior space of the sleeve or the sleeve-shaped soldered portion. In cross-section, the contact element thus has a contour which is known from crimping contacts with wires. The cross-sectional contour may be designed such that the slit is completely closed in the longitudinal direction and thus no distance is present between the bent sleeve edges, or that the slit is provided with a distance ensuring sufficient stability and is thus only slightly open. Furthermore, the cross-sectional contour may be completely or only partially closed so that either no interior space or an interior space extending in the longitudinal direction of the soldered portion is present. Due to the complete closure, a cross-sectional contour is achieved which corresponds to a turned contact and thus has the advantages in stability and small space requirement, but without the cost of a deposited contact, the higher weight, or a higher material requirement in the sheet metal strip as in the known solder terminals mentioned above.

Given a completely closed cross-sectional contour, solder is prevented from penetrating into the free end, which is placed from above onto a solder face given SMD, or into the soldered portion given a soldered portion penetrating the printed circuit board (THR/THT), and soldering thus only takes place on the outside of the soldered portion.

Given an only partially closed cross-sectional contour, referred to below as an open cross-sectional contour, solder is not only located in the outer region of the soldered portion, where it forms a solder fillet, but also partially draws up on the inside of the soldered portion. The thereby increased wetting surface for the solder ensures a greater strength of the soldering zone between contact element or soldered portion and solder pad. Due to this higher specific stability in the soldering region, depending on the nature of the printed circuit board, a smaller area for the solder pad is required in order to achieve a strength of the connection of contact element to printed circuit board that is comparable to the prior art. This enables simpler and more compact printed circuit board designs to have smaller stencil openings or, given use of larger stencil openings, enables a greater force transmission and thus greater robustness of the soldered connection.

The production of such a contact element advantageously takes place in such a way that the bending of the sleeve edges into the interior space takes place after the electroplating of the contact element.

According to a further embodiment of the contact element, the length of the bent sleeve edges protruding into the interior space is 70 to 90% of the inner diameter of the sleeve-shaped soldered portion given an open cross-sectional contour. In that the sleeve edges running substantially in parallel protrude far into the interior space of the sleeve-shaped soldered portion, the rigidity is increased. Depending on the degree of protrusion, the cross-section for the quantity of the rising solder is influenced.

According to a further embodiment, the cross-sectional contour is completely closed. As stated above, this has the effect that no solder rises on the inside of the soldered portion.

According to a particularly preferred embodiment, the cross-sectional contour of the sleeve-shaped soldered portion at the free end of said soldered portion is not completely closed in a front region and is completely closed in an adjoining rear region. In this way, a solder barrier that can be adjusted as desired in its height is also provided in this embodiment. This embodiment has the advantage that the solder fillet is formed on the outside in the front region of the soldered portion and the solder draws upward on the inside along the sleeve edge of the front region, and an additional stability with respect to the outer soldered connection is thereby produced on the inside of the soldered portion. This can be adjusted depending on the use case.

Figure 2:
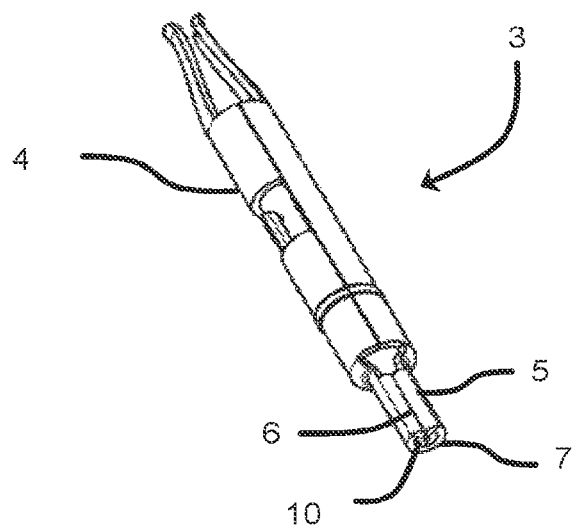
FIG. 2 shows an enlarged representation of a sleeve-shaped contact element with a soldered portion having sleeve edges bent into an interior space.

A contact 1 in FIG. 1 shows a sheet metal strip 2 on which is fastened a stamped-rolled contact element 3. According to FIG. 2, the contact element 3 has a connection region 4 and a soldered portion 5. In this case, the connection region 4 serves for insertion of a contact pin. The soldered portion 5 is sleeve-shaped and has a slit 6, which adjoins the connection region 4 and, given SMD, runs in the longitudinal direction up to the free end or contact region 7 with respect to a printed circuit board, bent edges 10 of the sleeve-shaped soldered portion 5 abutting against one another at said slit. The edges 10 of the sleeve-shaped soldered portion 5 are bent inward and compressed more or less strongly. In this representation, the edges 10 of the sleeve-shaped soldered portion 5 are compressed only to such an extent that solder 12' may rise from the free end 7 into the entire soldered portion 5, as shown in FIG. 3C.

FIG. 3A shows the soldered portion 5, in which the edges 10 are completely compressed so that, as is apparent from the cross-sectional representation, only one solder fillet with solder 12 may be formed by the solder pad located on the printed circuit board. In this embodiment, the soldered portion 5 has a closed cross-sectional contour. In Figure B, the soldered portion 5 is subdivided into a front region 8 and a rear region 9. In the front region 8, the bent sleeve edges 10 are not completely closed (open cross-sectional contour), i.e., there is an interior space 11 in which the solder 12' can rise in the soldered portion 5 up to the rear region 9 with a closed cross-sectional contour. In this embodiment, in addition to the solder fillet with solder 12, the stability of the entire connection is reinforced by the solder 12' rising in the interior space 11. The length of the front region 8 and the rear region 9 may be variably adjusted. Finally, FIG. 3c shows a variant in which the entire soldered portion 5 is not closed (open cross-sectional contour) so that the solder 12 may rise in the interior space 11 until no further solder 12' is available. In this embodiment, the stability with respect to the embodiment of FIG. 3B is even further increased by additional solder 12' with respect to the solder fillet with solder 12.

Shown in FIG. 4 is the embodiment with a circular tubular soldered portion 5, wherein identical reference signs denote the same components known from preceding figures. In FIG. 4A, a solder barrier 13 is formed at the free end 7, is folded over at the face end of the soldered portion 5, seals the interior space 11 (not visible in this representation), and prevents the penetration of solder, which is located only as a solder fillet on the circumference of the soldered portion 5. FIG. 4B shows a solder barrier 13 remote from the free end 7, wherein the distance from the free end 7 can be adjusted as desired.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Contact
2 Sheet metal strip
3 Contact element
4 Terminal portion
5 Soldered portion
6 Slit
7 Free end/contact region with respect to printed circuit board
8 Front region
9 Rear region
10 Sleeve edge
11 Interior space
12, 12' Solder
13 Solder barrier

The invention claimed is:

1. An integral stamped-rolled electrical contact element, comprising:
   a terminal portion and an adjoining soldered portion configured to electrically contact a contact face by a soldered connection,
   wherein the soldered portion comprises a slit in a longitudinal direction,
   wherein an interior space of the soldered portion is at least one of continuously hollow, interrupted, or at least partially filled in the longitudinal direction, and
   wherein sleeve edges formed along the slit are bent inward and protrude into the interior space of the soldered portion.

2. The contact element of claim 1, wherein the soldered portion has, at least partially in the interior space, a surface that takes up solder and begins at a contact region.

3. The contact element of claim 1, wherein, in the interior space, a solder barrier is arranged so as to prevent solder rising in the interior space from a contact region.

4. The contact element of claim 3, wherein the solder barrier comprises a bent flap which is punched out of a circumferential surface of the soldered portion, which flap, located in the interior space, is configured to seal the interior space against further-rising solder.

5. The contact element of claim 1, wherein the soldered portion is sleeve-shaped and has a cross-sectional contour which is completely closed.

6. The contact element of claim 4, wherein the bent flap comprises a bent omega-like flap.

7. An integral stamped-rolled electrical contact element, comprising:
   a terminal portion and an adjoining soldered portion configured to electrically contact a contact face by a soldered connection,
   wherein the soldered portion comprises a slit in a longitudinal direction,
   wherein an interior space of the soldered portion is at least one of continuously hollow, interrupted, or at least partially filled in the longitudinal direction, wherein sleeve edges formed along the slit are bent inward and protrude into the interior space of the soldered portion, and wherein a length of the bent sleeve edges protruding into the interior space is 70 to 90% of an inner diameter of the soldered portion.

8. An integral stamped-rolled electrical contact element, comprising:

a terminal portion and an adjoining soldered portion configured to electrically contact a contact face by a soldered connection, wherein the soldered portion comprises a slit in a longitudinal direction, wherein an interior space of the soldered portion is at least one of continuously hollow, interrupted, or at least partially filled in the longitudinal direction, wherein sleeve edges formed along the slit are bent inward and protrude into the interior space of the soldered portion, and wherein the soldered portion has, at a free end of the soldered portion, a cross-sectional contour which is not completely closed in a front region and completely closed in an adjoining rear region.

* * * * *